United States Patent [19]

Nishida et al.

[11] Patent Number: 5,586,098
[45] Date of Patent: Dec. 17, 1996

[54] OPTICAL DISC APPARATUS FOR CONTROLLING LASER POWER FOR EACH ZONE OF A ZONE RECORD SYSTEM

[75] Inventors: Norio Nishida; Futoshi Tsukada, both of Kanagawa, Japan

[73] Assignee: Sony Corporation, Tokyo, Japan

[21] Appl. No.: 407,966

[22] Filed: Mar. 22, 1995

[30] Foreign Application Priority Data

Mar. 29, 1994 [JP] Japan .................................. 6-082575

[51] Int. Cl.$^6$ ................................................. G11B 7/00
[52] U.S. Cl. .................... 369/116; 369/44.26; 369/100
[58] Field of Search ........................... 369/44.26, 44.34, 369/54, 100, 116, 47, 48, 32

[56] References Cited

U.S. PATENT DOCUMENTS

| | | | |
|---|---|---|---|
| 4,796,250 | 2/1989 | Kobayashi et al. | 369/54 |
| 4,896,311 | 1/1990 | Ishihara | 369/47 |
| 5,172,352 | 12/1992 | Kobayashi | 369/44.26 |
| 5,216,660 | 6/1993 | Iimura | 369/116 |
| 5,245,595 | 9/1993 | Yasukawa | 369/32 |
| 5,247,494 | 9/1993 | Ohno et al. | 369/13 |
| 5,276,564 | 1/1994 | Hessing et al. | 360/51 |
| 5,278,814 | 1/1994 | Deguchi et al. | 369/47 |
| 5,315,456 | 5/1994 | Hessing et al. | 360/77.08 |
| 5,365,507 | 11/1994 | Fuji et al. | 369/116 |
| 5,388,087 | 2/1995 | Saiki et al. | 369/48 |
| 5,400,309 | 3/1995 | Satomura | 369/32 |
| 5,450,383 | 9/1995 | Call | 369/116 |

FOREIGN PATENT DOCUMENTS

| | | | |
|---|---|---|---|
| 0178657 | 4/1986 | European Pat. Off. | G11B 19/247 |
| 0461912A2 | 12/1991 | European Pat. Off. | G11B 20/10 |
| 2578346 | 1/1986 | France | G11B 25/04 |
| 2635401 | 2/1990 | France | G11B 5/02 |

*Primary Examiner*—David C. Nelms
*Assistant Examiner*—Son Mai
*Attorney, Agent, or Firm*—Limbach & Limbach L.L.P.

[57] ABSTRACT

An optical disc apparatus using zone record system that successively records data in a plurality of zones without a time lag in switching zones is disclosed. A phase error signal is formed with a reproduced signal of a servo zone of an optical disc 1. A servo clock is generated by a servo PLL 8. Data PLLs 9a and 9b divide the frequency of the servo clock. The laser power of the servo zone is detected by a circuit 11a so as to perform a read ALPC operation. The record laser power is detected by a circuit 11b so as to perform a write ALPC operation. A DSP 14 compares the monitor values and a reference value and controls a bias value of the drive signal so that the detected value becomes equal to the reference value. In write mode, a laser device emits pulse laser light in response to the data clock. Since the write ALPC operation is performed for the next zone while it is performed for the present zone, one of the PLLs 9a and 9b generates data clock for the present zone. The other generates the data clock for the next zone. These data clocks are selectively supplied to the laser device.

3 Claims, 9 Drawing Sheets

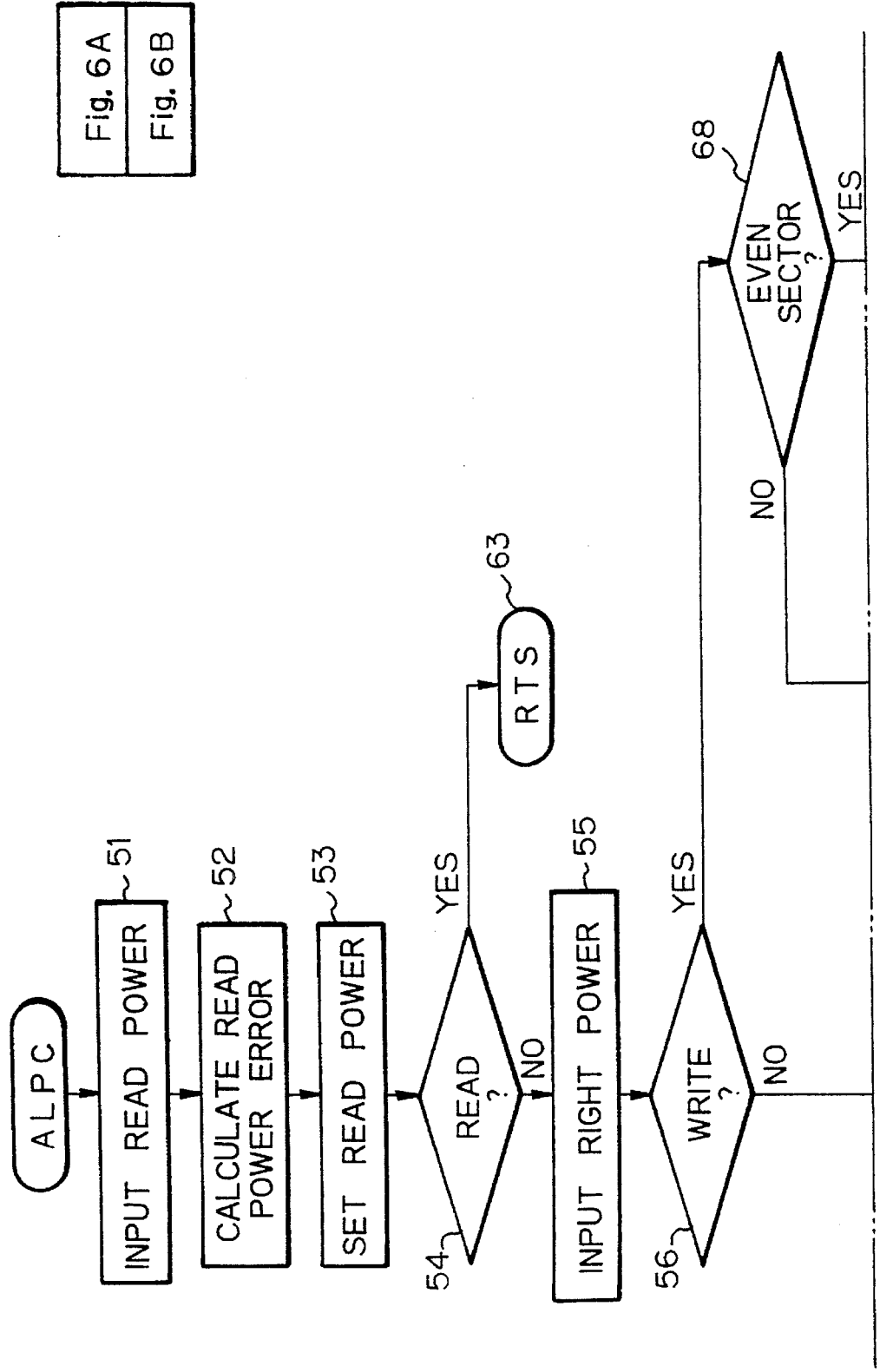

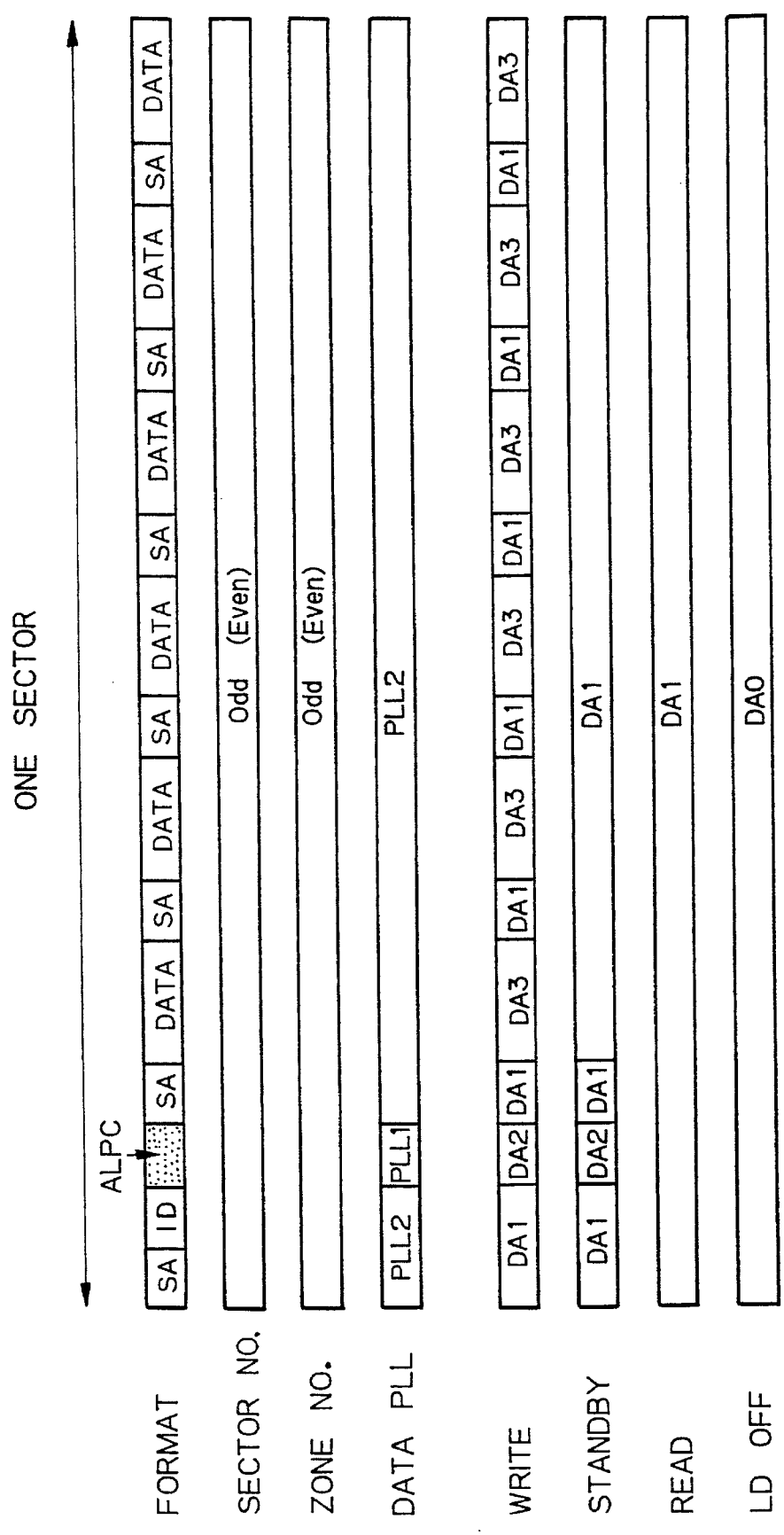

OPTICAL DISC APPARATUS FOR CONTROLLING LASER POWER FOR EACH ZONE OF A ZONE RECORD SYSTEM

BACKGROUND OF THE INVENTION

1. Field of the Invention

The present invention relates to an optical disc apparatus using a recordable optical disc, in particular, to an optical disc apparatus corresponding to ALP (Automatic Laser Power Control).

2. Description of the Related Art

Recordable optical discs such as magneto optical (MO) discs and phase-change type optical discs have been widely used. In these optical discs, when data is recorded and reproduced thereto and therefrom, a tracking control is required so as to trace the laser spot to a predetermined position. A sample format in which servo areas for tracking control are pre-recorded with predetermined intervals in track direction is known. In a servo zone, two pits are formed radially in opposite directions against the center of a track. The pits are referred to as wobble pits. The tracking control is performed so that the center of the laser spot accords with the center of the track corresponding to the levels of the reproduced signals of the two pits.

When the optical disc is rotated with a constant angular velocity (CAV), the linear velocity is reverse proportional to the distance from the center of the disc. When the data rate of record data is constant, the record density in the outer areas decreases. To prevent this problem, a zone record system has been proposed. In the zone record system, the disc is rotated at the CAV. The record area on the disc is radially divided into a plurality of sub-areas (referred to as zones). The record density of each zone is almost kept constant.

In other words, in outer zones of the disc, the data rate of record data increases. In the innermost zone, the frequency of the data clock (referred to as the channel clock) that synchronizes with the data rate is the minimum. In the outermost zone, the frequency of the data clock is the maximum. In each zone, the frequency of the data clock is constant. The sample format can be applied to the zone record system. In this case, the time intervals in the servo areas are constant in not only the zones, but the entire record areas.

In the magnetic field modulating type MO disc recording apparatus, when data is recorded, the laser light is turned on and off depending on the rate of the data clock. When data is reproduced, the laser light is successively emitted. When data is recorded and reproduced, the laser power is controlled in the following manner. When data is reproduced, the power of the laser beam than is successively emitted is controlled according to the level of the light reflected from the servo area. When data is recorded, the power of the laser is controlled according to the level of light reflected from a power control area (referred to as ALPC (Automatic Laser Power Control) area) formed on the disc.

In the above-described zone record system, since the frequency of the data clock varies, zone by zone, the frequency of the emitted pulse light that synchronizes with the data clock varies, zone by zone. When the frequency of the emitted pulse light varies, the power of the recording laser is properly adjusted by the ALPC. Otherwise, pits with a required size (actually, the pits are magnetic patterns) cannot be formed on the disc. Generally, the laser power should be increased according to the clock frequency.

In the zone record system, when the spot of the record laser beam is moved to another zone, until an optimum laser power thereof is set, a time lag takes place to some extent. When a large amount of data such as image data is recorded, it may be recorded in two or more successive zones. When the zone is changed, if there is a time lag, data cannot be successively recorded. Alternatively, when the zone is changed, a special data process may be required. Thus, the process or hardware becomes complicated.

OBJECTS AND SUMMARY OF THE INVENTION

Therefore, an object of the present invention is to provide an optical disc apparatus in which record laser power corresponding to each zone is present so as to eliminate the time lag necessary for changing the zone.

The present invention is an optical disc apparatus for accessing an optical disc corresponding to zone CAV system, comprising an optical pickup for emitting laser light to the optical disc and accessing the optical disc, first and second storing circuits for storing drive power data with which the optical pickup is driven, a servo clock generating circuit for generating a servo clock signal with which the optical disc is driven at CAV corresponding to information recorded on the optical disc, first and second data clock generating circuits for generating data clock signals for driving the access circuit corresponding to the servo clock signal and the zone information, a selecting circuit for selectively outputting the data clock signals that are output from the first and second data clock generating circuits corresponding to the control signal, a driving circuit for driving the optical pickup corresponding to the data clock signal selected by the selecting circuit and the drive power data stored in the storing circuit, a detecting circuit for detecting the power of the laser light that is output from the optical pickup, a reference value storing circuit for storing a reference value, and a control circuit for supplying zone information corresponding to a first zone accessed by the optical pickup to the first data clock circuit and zone information corresponding to a second zone preceded by the first zone accessed by the optical pickup to the second data clock circuit, for causing the selecting circuit to select the first data clock signal while a particular area of the optical disc is being accessed by the optical pickup in the period that the first zone is accessed by the optical pickup, for generating the drive power data for the first zone corresponding to the output of the detecting circuit and the reference value and causing the first storing circuit to store the drive power data, for causing the selecting circuit to select the second data clock signal while a particular area of the optical disc is being accessed by the optical pickup, and for generating the drive power data for the second zone corresponding to the output of the detecting circuit and the reference value and causing the second storing circuit to store the drive power data.

These and other objects, features and advantages of the present invention will become more apparent in light of the following detailed description of a best mode embodiment thereof, as illustrated in the accompanying drawings.

BRIEF DESCRIPTION OF DRAWINGS

FIGS. 6A and 6B are flow charts showing an ALPC operation;

FIG. 8 is a timing chart for explaining the ALPC operation.

DESCRIPTION OF PREFERRED EMBODIMENTS

Figure 1:
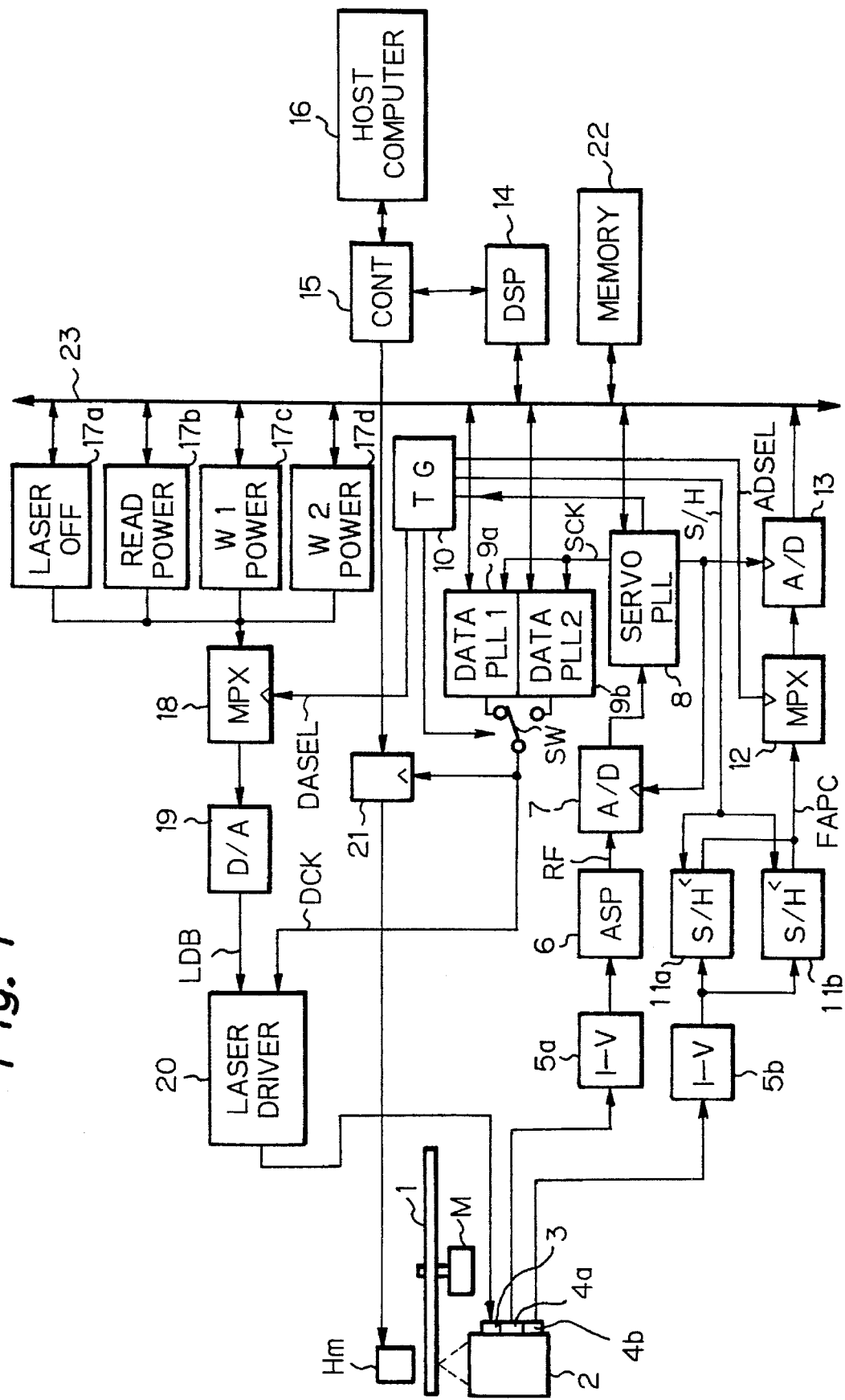
FIG. 1 is a block diagram showing a construction of an embodiment of the present invention.

Next, with reference to the accompanying drawings, an embodiment of the present invention will be described. FIG. 1 shows an overall construction of the embodiment. In FIG. 1, a disc 1 is an MO disc. The disc 1 is rotated at a constant angular velocity by a motor M. In relation to the disc 1, an optical block 2 and a magnetic head Hm are provided.

The optical block 2 comprises a laser device 3, an objective lens, a mirror, a polarized beam splitter, detectors 4a and 4b, an actuator, and a moving mechanism. The laser device 3 records and reproduces data to and from the disc 1. The actuator controls the focus and tracking of the spot of light beam. The moving mechanism performs a seek operation. The detector 4a has four divided portions to which light reflected from the disc 1 is entered. The detector 4b monitors light emitted from the laser device 3. In FIG. 1, since a portion that generates a focus error signal and a portion that processes reproduced data are out of the scope of the present invention, they are omitted.

Figure 2:
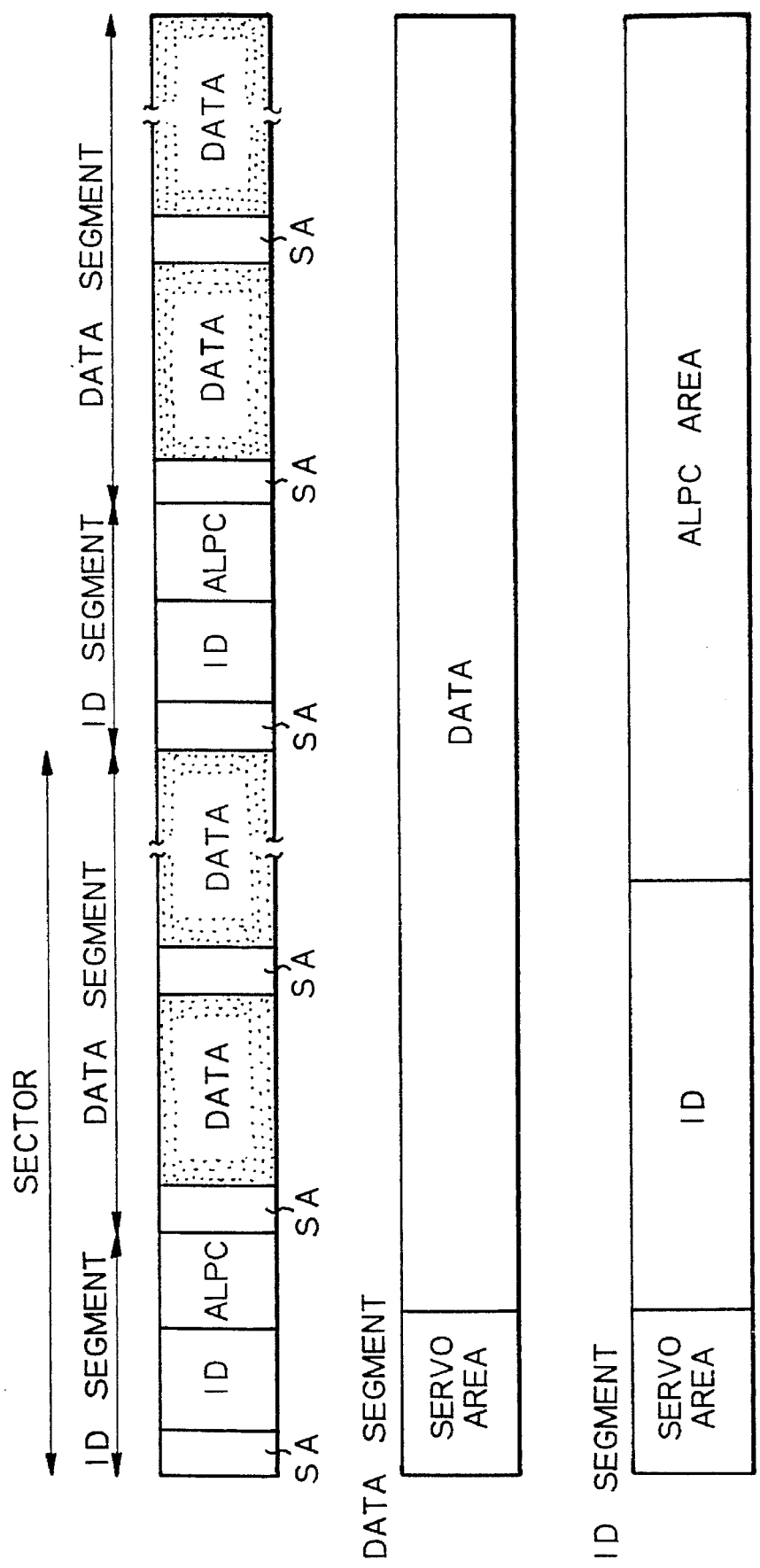
FIG. 2 is a schematic diagram showing a data format of a disc according to the present invention.

In the embodiment, the disc 1 has the sample format and the zone record system. FIG. 2 shows an example of the format of the disc 1. One sector is composed of one ID segment and for example 13 data segments. At the beginning of each sector and between each data segment, servo areas SA are formed. FIG. 2 includes enlarged schematic diagram showing one data segment and one ID segment. In an ID area of the ID segment, pits that represent the addresses of the track and sector are formed. The ID area is followed by an ALPC area with which the ALPC operation is performed in record mode.

Figure 3:
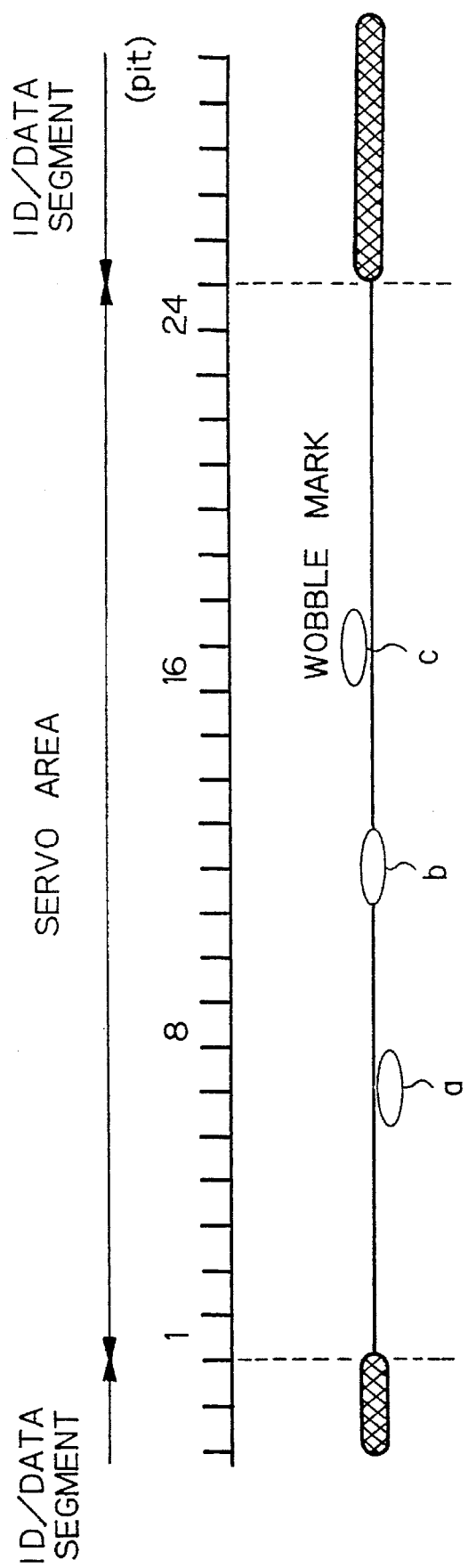
FIG. 3 is an enlarged schematic diagram showing a servo area of the data format according to the present invention.

As shown in FIG. 3, the servo area SA includes pits a, b, and c. The pit b is formed at the center of the track. The pits a and c are formed radially in opposite directions against the pit b. In FIG. 3, a time axis is designated by numbers 1 to 24 that represent clock timing. A phase error and a tracking error are detected corresponding to the reproduced RF levels of the pits a, b, and c that are sampled at the clock timing.

Assume that when the levels of the centers of the pits a and b that are sample-held are represented by a0 and c0, respectively, a tracking error signal is formed with (c0−a0). Assume that the levels of the center of the pit a that are sample-held at clock positions just preceding and just following the center of the pit a are represented by a1 and a2, respectively. In addition, assume that the levels of the center of the pit c that are sample-held at clock positions just preceding and just following the center of the pit c are represented by c1 and c2, respectively. In this case, a phase error signal is formed with $1/2 [(a2-a1)+(c2-c1)]$.

The phase error signal is calculated and formed by a servo PLL (Phase-Locked Loop) 8. A digital signal is supplied from an A/D converter 7 to the servo PLL 8. In other words, the detector 4a detects light reflected from the disc 1 and supplies the detected signal to an analog signal process circuit 6 through an I–V (current–voltage) converting circuit 5a. The output signal of the analog signal process circuit 6 is supplied to the A/D converter 7. The analog signal process circuit 6, for example, adjusts the gains of the reproduced signals of the pits in the servo area SA.

The servo PLL 8 includes a VCO (Variable Controlled Oscillator) that is controlled in response to a phase error signal. The VCO generates a servo clock (referred to as a system clock). Since the time intervals of the servo areas SA are constant, the frequency of the servo clock is constant regardless of the zones. The servo clock is used for a sampling clock for the A/D converters 7 and 13. In addition, the servo clock is supplied to a timing generator 10. Moreover, the servo clock is supplied to data PLLs 9a (PLL1) and 9b (PLL2).

The data PLLs 9a and 9b generate data clocks with frequencies that vary, zone by zone. Since two data PLLs are provided, data clocks for the present record zone and the next record zone can be generated at the same time. To generate the data clocks with the frequencies corresponding to these zones, a DSP 14 supplies a frequency dividing ratio control signal to the PLLs 9a and 9b through a DSP bus 23.

One of the output signals of the PLLs 9a and 9b is selected by a switch SW. The switch SW is operated in response to a switch control signal supplied from the timing generator 10. The data clock selected by the switch SW is supplied to a synchronizing circuit 21 and a laser driver 20. The output signal of the laser driver 20 is supplied to the laser device 3. The laser device 3 emits pulse light according to the data clock.

Figure 4:
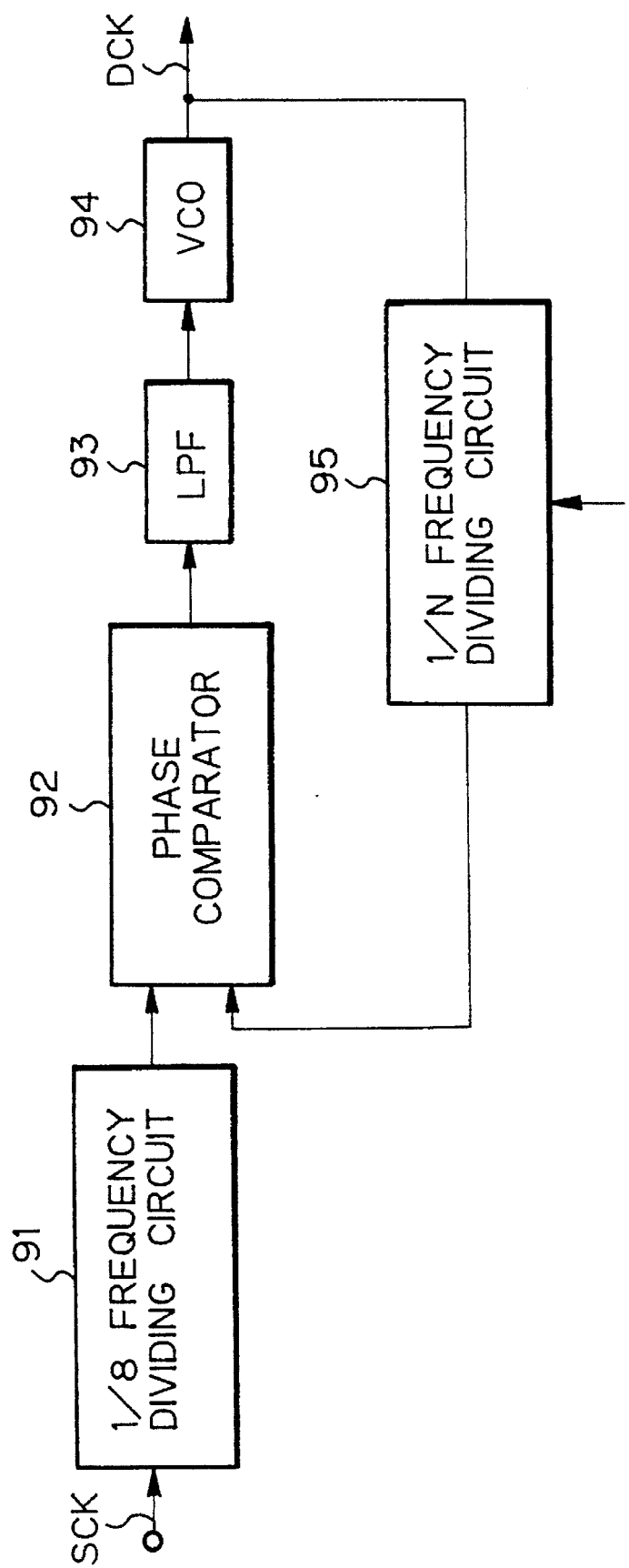
FIG. 4 is a detailed block diagram showing data PLLs 9a and 9b shown in FIG. 1.

FIG. 4 shows constructions of the data PLLs 9a and 9b. The construction of the data PLL 9a is the same as the construction of the data PLL 9b. In the data PLL 9a, a servo clock SCK supplied from the servo PLL 8 is sent to a ⅛ frequency dividing circuit 91 that divides the frequency of the servo clock SCK by 8. The frequency dividing ratio depends on the zone number. The output signal of the ⅛ frequency dividing circuit 91 is supplied to a phase comparator 92. The phase comparator 92 compares the phase of the output signal of the ⅛ frequency dividing circuit 91 and the phase of the output signal of an 1/N frequency dividing circuit 95. The compared result of the phase comparator 92 is supplied to a VCO (Variable Controlled Oscillator) 94 through a low-pass filter 93. Thus, the frequency of the data clock DCK that is output from the VCO 94 is controlled. The output signal of the VCO 94 is supplied to the switch SW (shown in FIG. 1) and the 1/N frequency dividing circuit 95. The frequency dividing ratio of the 1/N frequency dividing circuit 95 is designated as an integer value ranging from 1 to 8 according to the control signal received from the DSP 14. Thus, the data clock DCK that synchronizes with the servo clock SCK is generated.

Figure 5:
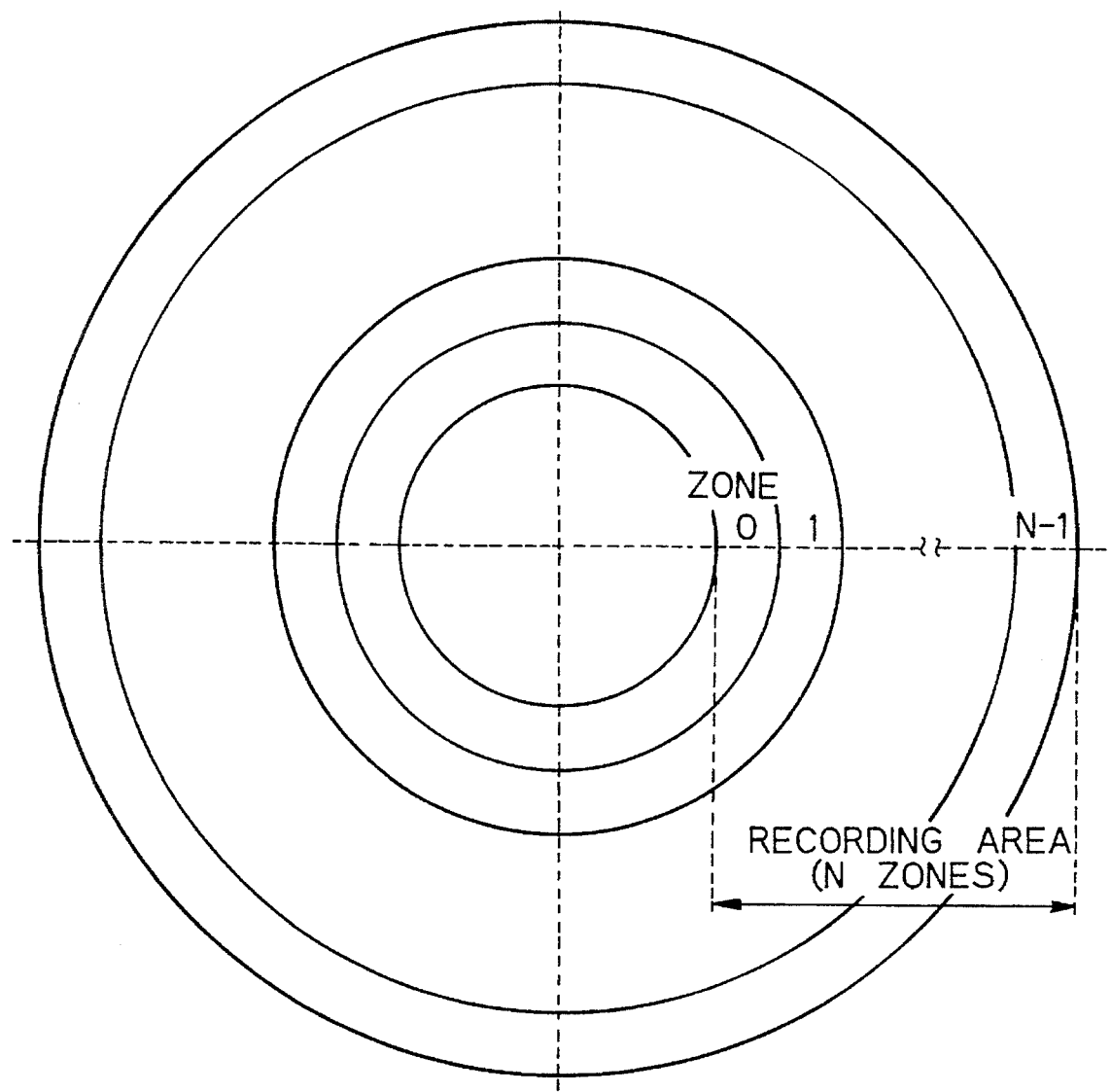
FIG. 5 is a schematic diagram for explaining a zone record system.

In addition, as shown in FIG. 5, the record area of the disc 1 is divided into N zones. The N zones are denoted by zone 0, zone 1, ..., zone N−1 from the innermost zone. To allow the record density of each zone to be nearly the same at a constant rotation of the disc 1, each zone has a different frequency of the data clock DCK. When nine zones are formed, the ratios of the frequencies of the data clocks DCK are designated as follows. The ratio at the zone 0 is ⅝. The ratio at the zone 1 is ⅞. ... The ratio at the zone 8 is 16/8. In the zone record system, at the outer peripheral zones, the record capacities per track increase. Thus, the record capacity of the entire disc can be increased in comparison with the CAV system, which does not zone the record area.

Data is recorded in the data areas of the data segments in the following manner. Record data is supplied to the magnetic head Hm. The magnetic field is modulated. The laser device 3 of the optical block 2 emits pulse light in synchronization with the data clock. As shown in FIG. 1, the record data is supplied to the magnetic head Hm through the synchronizing circuit 21. The record data is supplied from a controller 15 to the synchronizing circuit 21. The data clock selected by the switch SW is supplied to the synchronizing circuit 21.

The controller 15 interfaces the optical disc apparatus and a host computer 16. When the controller 15 receives a write command from the host computer 16, the controller 15 designates a sector to be accessed by the optical disc apparatus. In addition, the controller 15 encodes the data with error correction code and sends the encoded data to the synchronizing circuit 21. The synchronizing circuit 21 controls the magnetic field of the magnetic head Hm in synchronization with the data clock. A servo circuit (not shown) moves the actuator to the designated sector, performs the seek operation, and performs the write operation for the designated sector.

When the controller receives a read command from the host computer 16, the controller 15 designates a sector to be accessed. The actuator performs the seek operation for the designated sector. The detector 4a of the optical block 2 supplies an RF signal to a reproducing circuit (not shown). The reproducing circuit digitizes the RF signal. The digitized signal is supplied to the controller 15. The controller 15 corrects an error of the digitized signal corresponding to the error correction code and sends the reproduced data to the host computer 16.

Next, the ALPC operation will be described. To control the laser power in the read mode, at the servo area SA, the output signal of the detector 4b is sample-held so as to monitor the power of the laser device 3. The sample hold circuit 11a shown in FIG. 1 performs the ALPC operation in the read mode.

In the write mode, the laser power is controlled by sample-holding the laser power in the case that the laser spot is placed in the ALPC area. When data is recorded, although the laser device 3 emits pulse light, the average power thereof is sample-held. In other words, the I-V converting circuit 5b functions as a low-pass filter. A sample hold circuit 11b shown in FIG. 1 performs the ALPC operation in the write mode. The output signals of the sample hold circuits 11a and 11b are represented by FAPC. A sampling pulse S/H is supplied from the timing generator 10.

The sampling output FAPC is supplied to the A/D converter 13 through a multiplexer 12 that is controlled by a control signal ADSEL supplied from the timing generator 10. Sampled data of the digital signal supplied from the A/D converter 13 is sent to the DSP bus 23. The control signal ADSEL is generated by the timing generator 10. The control signal FAPC is supplied to a DSP (Digital Signal Processor) 14 through the DSP bus 23.

The DSP 14 controls the recording/reproducing operations and the data input/output with the host computer 16. In addition, as will described later, the DSP 14 controls the ALPC operation. The result of the ALPC operation (namely, laser drive designating data corresponding to each mode) is calculated by the DSP 14 and stored in registers 17a, 17b, 17c, and 17d through the DSP bus 23. The register 17a stores designated data corresponding to the laser off mode. The register 17b stores designated data corresponding to the read mode. The registers 17c and 17d store designated data corresponding to the write mode. The data stored in the register 17c is referred to as W1 power. The data stored in the register 17d is referred to as W2 power.

The data stored in the registers 17a to 17d are supplied to the D/A converter 19 through a multiplexer 18. The multiplexer 18 is controlled in response to the control signal ADSEL supplied from the timing generator 10. The output signal of the multiplexer 18 is supplied to the D/A converter 19. The D/A converter 19 converts the digital signal into an analog signal. The analog signal is supplied as a bias signal LDB to the laser driver 20. The bias signal LDB and the data clock signal DCK supplied from the switch SW are composited in the laser driver 20. The laser power is controlled according to the composite signal. An ALPC data storage memoir 22 is connected to the DSP bus 23. The memory 22 can store both reference data for each zone and designated data for each zone.

Figure 6B:
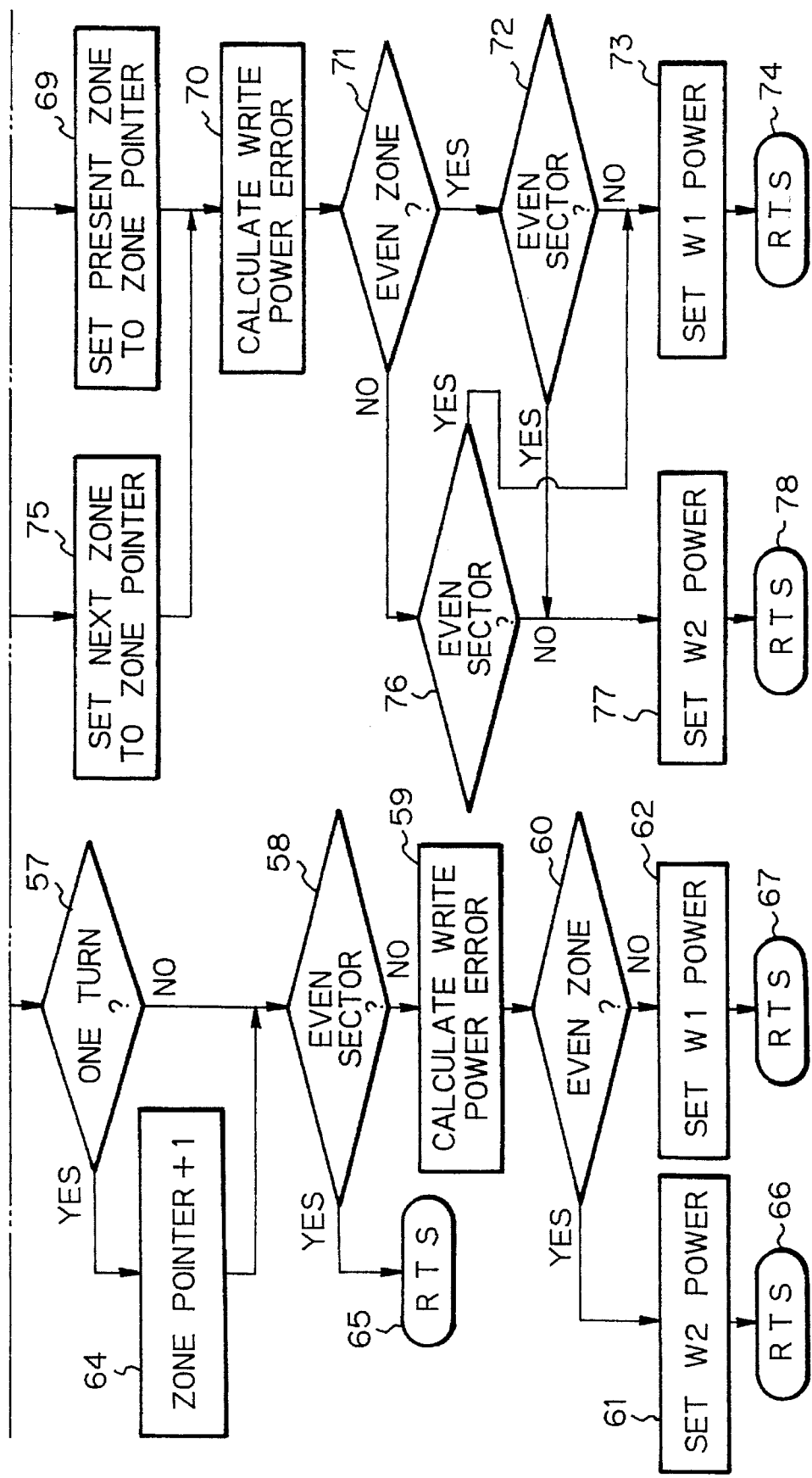

FIGS. 6A and 6B are flow charts showing the ALPC operation performed by the DSP 14. The processes in the flow chart are performed for each sector. The processes are finished in each sector. While the optical block 2 is accessing a servo area SA, the read ALPC process is performed. At step 51, a read power is supplied. At step S52, the designated value stored in the memory 22 is compared with the monitor value sampled by the sample hold circuit 11a so as to calculate a read error. At step 53, a laser drive current value that has been compensated corresponding to the error is obtained. The old value stored in the memory 22 is substituted with the new value and stored in the register 17b and the memory 22. The processes in the flow chart are performed for each sector. However, when the ALPC operation is initially performed for a sector, since value "0" is stored in the registers 17a and 17b, the laser device 3 does not emit laser light. At this point, the read power is "0" and the error becomes the reference value stored in the memory 22. Since the reference value is stored in the registers 17a, 17b, 17c, and 17d, and the memory 22, at the next sector, the laser device 3 is driven according to the laser drive current value designated based on the reference value. At a servo area SA, since servo information is read regardless of whether the present mode is the data write mode, the standby mode, or the read mode, this process is performed regardless of the mode.

Next, at step 54, it is determined whether or not the present mode is the read mode. When the determined result is YES (namely, the present mode is the read mode), since the read power has been designated, flow advances to step 63. At step 63, the ALPC operation is finished for the sector. When the determined result is NO (namely, the present mode is the write mode or the standby mode), flow advances to step 55. Thus, the ALPC operation is performed in the ALPC area.

At step S55, the write power in the case that the laser spot is placed at the ALPC area is supplied. At step 56, it is determined whether the present mode is the write mode or the standby mode. When the determined result is NO (namely, the present mode is the standby mode), flow advances to step 57. At step 57, it is determined whether or not the disc is rotated for one turn. This determination is performed when the ALPC operation is initially performed. In other words, although the processes in the flow chart are performed for each sector, it is determined whether or not the disc is rotated for one turn from the sector at which the processes in the flow chart have been performed. When the determined result at step 57 is YES (namely, the disc has been rotated for one turn), flow advances to step 64. At step 64, the value of the zone pointer stored in the DSP 14 is incremented by "1" The initial value of the zone pointer is "0" When the value of the zone pointer is changed from "7" to "8", it is reset to "0". When the determined result at step 57 is NO (namely, the disc has not been rotated for one turn) or after step 64, flow advances to step 58. At step 58, it is determined whether or not an even sector is being accessed. When the determined result is YES (namely, an even sector is being accessed), flow advances to step 65. At step 65, the ALPC operation is finished. When the determined result at step 58 is NO (namely., an odd sector is being accessed), flow advances to step 59. At step 59, a write power is designated. In this example, the write power is designated only for each odd sector. However, it should be noted that the write power can be designated only for each even sector. When the determined result at step 58 is NO (namely, an odd sector is being accessed), flow advances to step 59. At step 59, the value of the write power that has been input at step 55 is compared with the monitor value sampled by the sample hold circuit 11a so as to calculate an error. A laser drive current value in which the error has been corrected is obtained. At step 60, it is determined whether or not an even zone is being accessed. When the determined result is YES (namely, an even zone is being accessed), flow advances to step 61. At step 61, the designated values is stored as the write power W2 in the register 17d. When the determined result at step 60 is NO (namely, an odd zone is being accessed), flow advances to step 62. At step 62, the designated value is stored as the write power W1 in the register 17c. In addition, at steps 61 and 62, the designated values are stored as the zone value represented by the zone pointer in the memory 22.

In the standby mode, only for each odd sector, the designated value of each zone is obtained and stored in the memory 22. Thus, when data is recorded in a particular zone, since the designated value has been stored in the memory 22, the write operation can be immediately performed. This process is performed for a mode change from non-record mode to the record mode. Thus, it is not necessary to perform this process for all sectors. In this embodiment, although this process is performed only for each odd sector, it can be performed only for each even sector.

Next, when the determined result at step 56 is YES (namely, the present mode is the write mode), flow advances to step 68. At step 68, it is determined whether or not an even sector is being accessed. When the determined result is YES (namely, an even sector is being accessed), flow advances to step 69. At step 69, the next zone number is set to the pointer. When the determined result is NO (namely, an odd sector is being accessed), flow advances to step 75. At step 75, the next zone number is set to the pointer. Thereafter, flow advances to step 70. At step 70, the write power that has been supplied at step 55 is compared with the designated value so as to calculate a new write power. Thereafter, flow advances to step 71. At step 71, it is determined whether or not an even zone is being accessed. When the determined result is YES (namely, an even zone is being accessed), flow advances to step 72. At step 72, it is determined whether or not an even sector is being accessed. When the determined result is YES (namely, an even sector is being accessed), flow advances to step 77. When the determined result is NO (namely, an odd sector is being accessed), flow advances to step 73. When the determined result at step 71 is NO (namely, an odd zone is being accessed), flow advances to step 76. At step 76, it is determined whether or not an even sector is being accessed. When the determined result is YES (namely, an even sector is being accessed), flow advances to step 73. When the determined result is NO (namely, an odd sector is being accessed), flow advances to step 77. At step 73, the designated value is stored as the write power W1 in the register 17c. At step 77, the designated value is stored as the write power in the register 17d. In addition, at steps 73 and 77, the designated value is stored as the zone value represented by the zone pointer in the memory 22.

As described above, in the write mode, the record ALPC operation in the present zone including the present record position and the record ALPC operation in the next zone are alternately performed for each sector. For example, in the record ALPC area in each even sector, the record ALPC operation is performed for the zone in which the record position is present. In the record ALPC area in each odd sector, the record ALPC operation is performed for the next zone. In other words, the ALPC operation for the present zone and the ALPC operation for the next zone are alternately performed for each sector.

In the embodiment, as described above, to generate data clocks, the two PLLs 9a and 9b are provided. The frequency dividing ratios of the PLLs 9a and 9b are designated by the DSP 14 corresponding to the zone of the recording/reproducing position and the next zone.

In other words, when the present recording/reproducing position is present at an even zone, the main PLL is the PLL 9a (PLL1) and the sub PLL is the PLL 9b (PLL2). In contrast, when the present recording/reproducing position is present at an odd zone, the main PLL is the PLL 9b (PLL2) and the sub PLL is the PLL 9a (PLL1). The main PLL represents data PLL used for synchronization with the record data and for the record ALPC operation. The sub PLL is used only for the record ALPC operation. The PLLs are selected by the SW.

Figure 7:
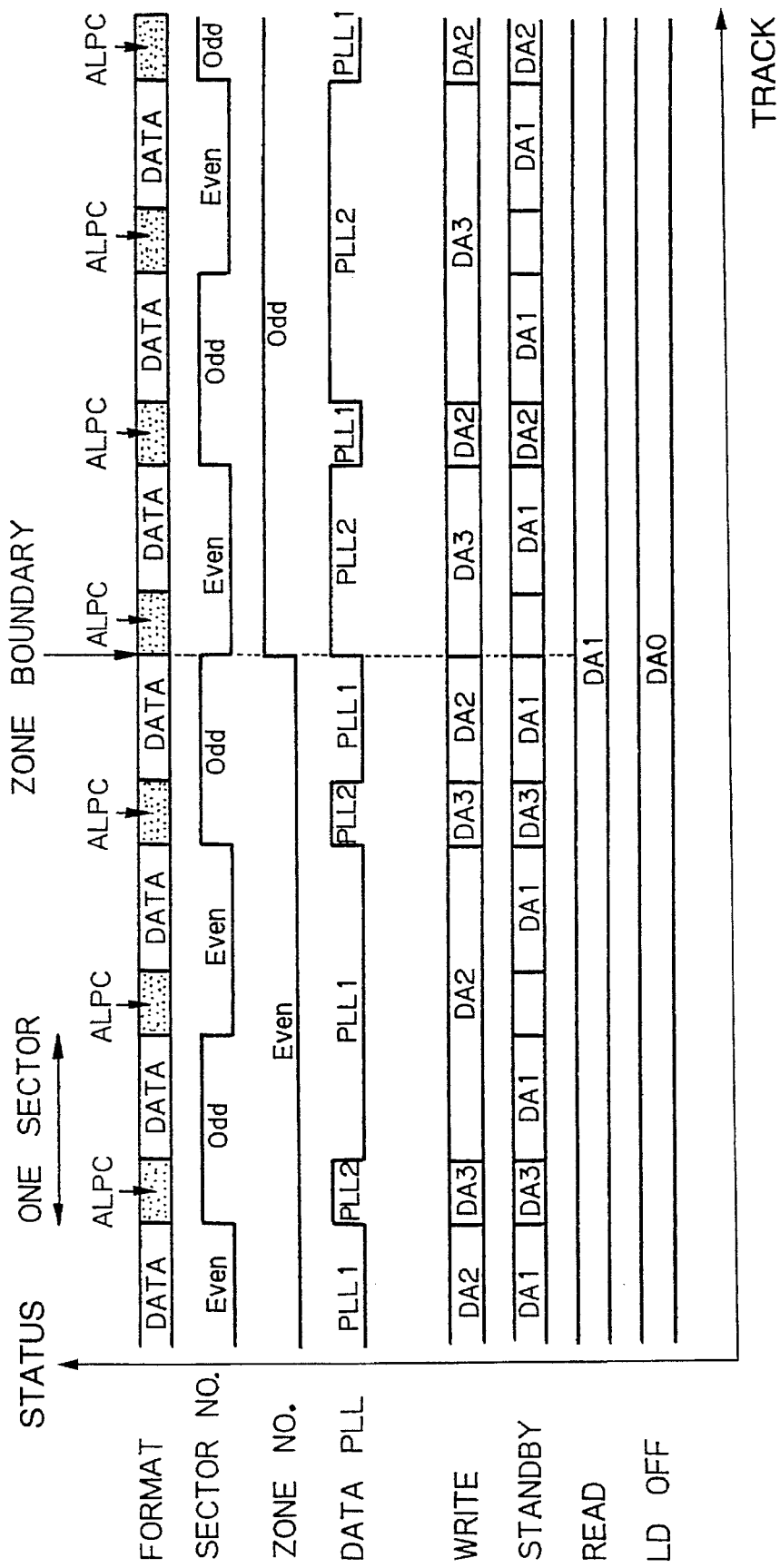
FIG. 7 is a timing chart for explaining the ALPC operation.

FIGS. 7 and 8 show timing charts of the ALPC operation and PLL control. In FIGS. 7 and 8, DA0, DA1, DA2, and DA3 represent states of the control signal DASEL that controls the multiplexer 18. When DASEL=DA0, the multiplexer 18 selects the content of the register 17a (namely, the designated data corresponding to the laser off mode). When DASEL=DA1, the multiplexer 18 selects the content of the register 17b (namely, the designated data corresponding to the read power mode). When DASEL=DA2, the multiplexer 18 selects the content of the register 17c (namely, the designated data corresponding to the write power W1 mode). When DASEL=DA3, the multiplexer 18 selects the content of the register 17d (namely, the designated data corresponding to the write power W2 mode). At the first row of FIG. 7, a record format is shown. At the second row, even and odd sector numbers are shown. At the third row, even and odd zone numbers are shown. At the first half portion of FIG. 7, signal states of an even zone are shown. At the second half portion, signal states of an odd zone are shown. At the even zone, the main PLL is PLL1. At the odd zone, the main PLL is PLL2. The data PLL is switched in such a manner.

In FIG. 7, the selection of the registers 17a to 17d corresponding to each of the write mode, standby mode, read mode, and laser off mode is shown. In the write mode, in the ALPC area of each even sector, the ALPC operation for the present zone is performed. In the ALPC area of each odd sector, the ALPC operation for the next zone is performed. In the next zone, data is recorded with the designated data of the preceding zone.

In each even zone, the content of the register 17c (W1 power) is selected to perform the ALPC operation for the present zone. In addition, the content (W2 power) of the register 17d is selected to perform the ALPC operation for the next odd zone. The content of the register 17d is selectively used to record the next odd zone. FIG. 8 shows the selection of PLLs for one sector (for example, an odd zone and an odd sector) and the selection of registers 17a to 17d.

In the standby mode, the record ALPC operation for each zone is successively performed in the record ALPC area for each odd sector. In other than the ALPC areas of odd sectors, the content of the register 17b (the designated data corresponding to the read power) is selected. In the read mode, the content of the register 17b is always selected. In the laser off mode, the content of the laser device 17a (the designated data corresponding to the laser off mode) is always selected. In the laser off mode, the laser device does not emit laser light.

Table 1 shows selections of data PLL and laser power designating data for each zone in the write mode.

TABLE 1

| Present zone | Main PLL | Sub PLL | Main write ALPC | | Sub write ALPC | |
|---|---|---|---|---|---|---|
| Even | PLL1 | PLL1 | Present zone | DA2 | Next zone | DA3 |
| Odd | PLL2 | PLL2 | Present zone | DA3 | Next zone | DA2 |

Table 2 shows the selections of data PLLs and laser power setting data in the standby mode.

TABLE 2

| Present zone | Main PLL | Sub PLL | Main write ALPC | Sub write ALPC | |
|---|---|---|---|---|---|
| Even | PLL1 | PLL1 | — | DA2 | All zones DA3 |
| Odd | PLL2 | PLL2 | — | DA3 | All zones DA2 |

Table 3 shows the selections of data PLL and laser power setting data corresponding to zone numbers in the read mode.

TABLE 3

| Present zone | Main PLL | Sub PLL | Sub write ALPC |
|---|---|---|---|
| Even | PLL1 | PLL2 | DA1 |
| Odd | PLL2 | PLL1 | DA1 |

The relation between odd numbers and even numbers can be adequately changed. In addition, the present invention can be applied to discs that have data formats different from that of the embodiment. Moreover, in the standby state, the interval of switching the ALPC operation in a plurality of zones is not limited to one turn of the disc. Furthermore, instead of a DSP, a CPU can be used. The number of data PLLs can be three or more rather than two.

According to the present invention, when data is recorded in the present zone, the designated value of the laser power of the next zone can be predetermined. Thus, when the present zone is changed, data can be recorded to the next zone without a time lag. Consequently, data of large capacity such as image data can be recorded without difficulty.

In addition, in the standby mode, data of laser power of all zones is calculated and stored. Thus, the apparatus can immediately change the mode from the standby mode to the write mode.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An optical disc apparatus for accessing an optical disc corresponding to zone constant angular velocity (CAV) system, comprising:
   an optical pickup for emitting laser light to the optical disc and accessing the optical disc;
   first and second storing means for storing drive power data with which said optical pickup is driven;
   servo clock generating means for generating a servo clock signal with which the optical disc is driven at CAV on the basis of information recorded on the optical disc;
   first and second data clock generating means for generating data clock signals for driving said access means on the basis of the servo clock signal and a zone information;
   selecting means for selectively outputting the data clock signals that are output from said first and second data clock generating means on the basis of a control signal;
   driving means for driving said optical pickup on the basis of the data clock signal selected by said selecting means and the drive power data stored in said first and second storing means;
   detecting means for detecting the power of the laser light that is output from said optical pickup;
   reference value storing means for storing a reference value; and
   control means
      (a) for supplying zone information corresponding to a first zone accessed by said optical pickup to said first data clock means and zone information corresponding to a second zone succeeding to the first zone accessed by said optical pickup to said second data clock means,
      (b) for causing said selecting means to select the first data clock signal while a particular area of said optical disc is being accessed by said optical pickup in the period that the first zone is accessed by said optical pickup,
      (c) for generating the drive power data for the first zone on the basis of the output of said detecting means and the reference value and causing said first storing means to store the drive power data,
      (d) for causing said selecting means to select the second data clock signal while a particular area of said optical disc is being accessed by said optical pickup, and
      (e) for generating the drive power data for the second zone corresponding to the output of said detecting means and the reference value and causing said second storing means to store the drive power data.

2. The optical disc apparatus as set forth in claim 1, further comprising third storing means, wherein said control means has a record mode and a standby mode, in the record mode, information being recorded by said optical pickup on the optical disc, in the standby mode, one track of the optical disc being successively accessed by said optical pickup, in the standby mode, zone information of all zones being sequentially supplied to said first and second data clock means regardless of a zone accessed by said optical pickup, said control means causing said third storing means to store designated values corresponding to each zone information.

3. The optical disc apparatus as set forth in claim 2, wherein said control means gets the designated values whenever the particular area is accessed in the record mode and gets the designated values whenever the particular area is accessed a plurality of times in the standby mode.

* * * * *